(12) United States Patent
Savant

(10) Patent No.: US 11,061,705 B2
(45) Date of Patent: Jul. 13, 2021

(54) MAINTAINING VIRTUAL MACHINE TEMPLATES

(71) Applicant: BMC SOFTWARE, INC., Houston, TX (US)

(72) Inventor: Pravin Savant, Pune (IN)

(73) Assignee: BMC Software, Inc., Houston, TX (US)

( * ) Notice: Subject to any disclaimer, the term of this patent is extended or adjusted under 35 U.S.C. 154(b) by 466 days.

(21) Appl. No.: 14/659,337

(22) Filed: Mar. 16, 2015

(65) Prior Publication Data

US 2016/0274927 A1    Sep. 22, 2016

(51) Int. Cl.
*G06F 9/455* (2018.01)

(52) U.S. Cl.
CPC .......... *G06F 9/45558* (2013.01); *G06F 2009/45591* (2013.01)

(58) Field of Classification Search
CPC .................................. G06F 9/45558
USPC ............................................. 718/1
See application file for complete search history.

(56) References Cited

U.S. PATENT DOCUMENTS

| | | | | |
|---|---|---|---|---|
| 5,319,645 | A * | 6/1994 | Bassi | G06F 11/3664 714/38.13 |
| 6,859,758 | B1 * | 2/2005 | Prabhakaran | G06F 11/3414 702/186 |
| 7,415,635 | B1 * | 8/2008 | Annangi | G06F 11/3414 714/25 |
| 7,478,278 | B2 * | 1/2009 | Archer | G06F 11/1438 714/15 |
| 7,804,947 | B2 * | 9/2010 | Brown | H04Q 3/0075 370/216 |
| 8,140,905 | B2 * | 3/2012 | Beaty | H04L 41/16 714/35 |
| 9,641,406 | B1 * | 5/2017 | Allen | H04L 43/04 |
| 2002/0104042 | A1 * | 8/2002 | Wong | G06F 11/2294 714/38.14 |
| 2004/0044643 | A1 * | 3/2004 | deVries | G06F 9/45558 |
| 2004/0261053 | A1 * | 12/2004 | Dougherty | G06F 8/20 717/101 |
| 2005/0071447 | A1 * | 3/2005 | Masek | G06F 11/3688 709/223 |
| 2006/0015841 | A1 * | 1/2006 | Bishop | G06F 9/5077 717/102 |

(Continued)

OTHER PUBLICATIONS

Notice of Allowance received for U.S. Appl. No. 13/840,053, dated Mar. 25, 2015, 16 pages.

(Continued)

*Primary Examiner* — Andrew M. Lyons
(74) *Attorney, Agent, or Firm* — Brake Hughes Bellermann LLP

(57) ABSTRACT

A non-transitory computer-readable storage medium may comprise instructions for determining health statuses of multiple virtual machine templates stored thereon. When executed by at least one processor, the instructions may be configured to cause a health status server to at least run multiple scripts against multiple virtual machines, each of the multiple virtual machines being generated from one of the multiple virtual machine templates, and generate, for each of the multiple virtual machines, an output report indicating success or failure for each of the multiple scripts.

20 Claims, 6 Drawing Sheets

(56) References Cited

U.S. PATENT DOCUMENTS

| | | | |
|---|---|---|---|
| 2006/0015852 A1* | 1/2006 | Parkinson | G06F 11/3688 717/126 |
| 2006/0184937 A1* | 8/2006 | Abels | G06F 8/65 718/1 |
| 2006/0247878 A1* | 11/2006 | Manfredi | G06F 11/3672 702/108 |
| 2007/0168734 A1* | 7/2007 | Vasile | G06F 11/3672 714/33 |
| 2008/0126867 A1* | 5/2008 | Pandarinathan | G06F 11/3688 714/37 |
| 2008/0134176 A1* | 6/2008 | Fitzgerald | G06F 9/45537 718/1 |
| 2008/0141240 A1* | 6/2008 | Uthe | G06F 8/61 717/174 |
| 2008/0178144 A1* | 7/2008 | Bazigos | G06F 8/20 717/101 |
| 2008/0263258 A1 | 10/2008 | Allwell et al. | |
| 2008/0263505 A1* | 10/2008 | StClair | G06F 8/10 717/101 |
| 2008/0271019 A1* | 10/2008 | Stratton | G06F 21/577 718/1 |
| 2009/0007105 A1* | 1/2009 | Fries | G06F 8/65 718/1 |
| 2009/0100420 A1* | 4/2009 | Sapuntzakis | G06F 8/65 717/171 |
| 2009/0300423 A1* | 12/2009 | Ferris | G06F 11/36 714/38.1 |
| 2009/0300607 A1 | 12/2009 | Ferris et al. | |
| 2009/0307763 A1* | 12/2009 | Rawlins | G06F 11/2294 726/5 |
| 2009/0327471 A1* | 12/2009 | Astete | G06F 9/45533 709/223 |
| 2010/0050171 A1 | 2/2010 | Liang et al. | |
| 2010/0112780 A1* | 5/2010 | Thompson | H01L 21/76254 438/458 |
| 2010/0162047 A1* | 6/2010 | Haley | G06F 11/3688 714/37 |
| 2011/0004676 A1 | 1/2011 | Kawato | |
| 2011/0022694 A1* | 1/2011 | Dalal | H04L 41/0843 709/222 |
| 2011/0083122 A1* | 4/2011 | Chen | G06F 11/3664 717/124 |
| 2011/0154320 A1* | 6/2011 | Verma | G06F 8/63 718/1 |
| 2011/0176441 A1* | 7/2011 | Matsuoka | G06F 11/3409 370/252 |
| 2012/0066677 A1 | 3/2012 | Tang | |
| 2012/0072968 A1* | 3/2012 | Wysopal | G06F 11/3612 726/1 |
| 2012/0089972 A1 | 4/2012 | Scheidel et al. | |
| 2012/0144236 A1* | 6/2012 | Black | H04L 41/145 714/25 |
| 2013/0031548 A1 | 1/2013 | Kurozumi | |
| 2013/0042239 A1 | 2/2013 | Mousseau et al. | |
| 2013/0198739 A1* | 8/2013 | Razdan | G06F 9/45558 718/1 |
| 2013/0232245 A1* | 9/2013 | Antosz | G06F 8/10 709/222 |
| 2013/0274006 A1* | 10/2013 | Hudlow | G07F 17/3223 463/29 |
| 2014/0026131 A1* | 1/2014 | Ravi | G06F 9/44505 717/177 |
| 2014/0047545 A1* | 2/2014 | Sidagni | G06F 21/577 726/25 |
| 2014/0068340 A1* | 3/2014 | Dayal | G06F 11/3672 714/38.1 |
| 2014/0082420 A1* | 3/2014 | Greer | G06F 11/3692 714/33 |
| 2014/0201725 A1* | 7/2014 | Tian | G06F 8/63 717/169 |
| 2014/0282519 A1 | 9/2014 | Apte et al. | |
| 2014/0289566 A1* | 9/2014 | Timashev | G06F 9/44589 714/38.1 |
| 2014/0351412 A1* | 11/2014 | Elisha | G06F 11/3428 709/224 |
| 2015/0052402 A1* | 2/2015 | Gurumurthy | G06F 11/3688 714/38.1 |
| 2017/0208099 A1* | 7/2017 | Schmidt | H04L 63/20 |

OTHER PUBLICATIONS

"Quick Start Guide", VMware vCenter™ Protect 8.0, Virtual Machine, 2008-2011, 28 pages.

"What tools do you use for automated grading of assignments that involve programming?", Research Gate, retrieved from: http://www.researchgate.net/post/What_tools_do_you_use_for_automated_grading_of_assignrnents_that_involve_programming, 2015, 3 pages.

VMware vCenter Protect Virtual Machine Quick Start Guide, VMware Inc., 2011, 28 pages.

* cited by examiner

MAINTAINING VIRTUAL MACHINE TEMPLATES

TECHNICAL FIELD

This description relates to virtual machine templates.

BACKGROUND

Virtual machine templates may be used to create virtual machines. The virtual machine templates may have problems that propagate into the virtual machines.

SUMMARY

According to an example implementation, a non-transitory computer-readable storage medium may comprise instructions for determining health statuses of multiple virtual machine templates stored thereon. When executed by at least one processor, the instructions may be configured to cause a health status server to at least run multiple scripts against multiple virtual machines, each of the multiple virtual machines being generated from one of the multiple virtual machine templates, and generate, for each of the multiple virtual machines, an output report indicating success or failure for each of the multiple scripts.

According to another example implementation, a non-transitory computer-readable storage medium may comprise instructions for determining health statuses of multiple virtual machine templates stored thereon. When executed by at least one processor, the instructions may be configured to cause a health status server to at least launch a virtual machine from a virtual machine template, run at least a first script and a second script against the virtual machine, determine whether a first job passes the first script and whether a second job passes the second script, and output a report indicating whether the first job passed and whether the second job passed.

According to another example implementation, a non-transitory computer-readable storage medium may comprise instructions for determining health statuses of multiple virtual machine templates stored thereon. When executed by at least one processor, the instructions may be configured to cause a health status server to at least launch a virtual machine from a virtual machine template, concurrently run at least a first script and a second script against the virtual machine as background jobs, determine whether a first job passes the first script and a second job passes the second script, output a report indicating whether the first job passed and whether the second job passed, receive modification input based on the report indicating that the first job did not pass, modify the virtual machine based on the received modification input, implement modifications to the virtual machine template based on the modifications to the virtual machine, and decommission the virtual machine in response to determining that the first job passed and the second job passed.

The details of one or more implementations are set forth in the accompanying drawings and the description below. Other features will be apparent from the description and drawings, and from the claims.

DETAILED DESCRIPTION

Figure 1:
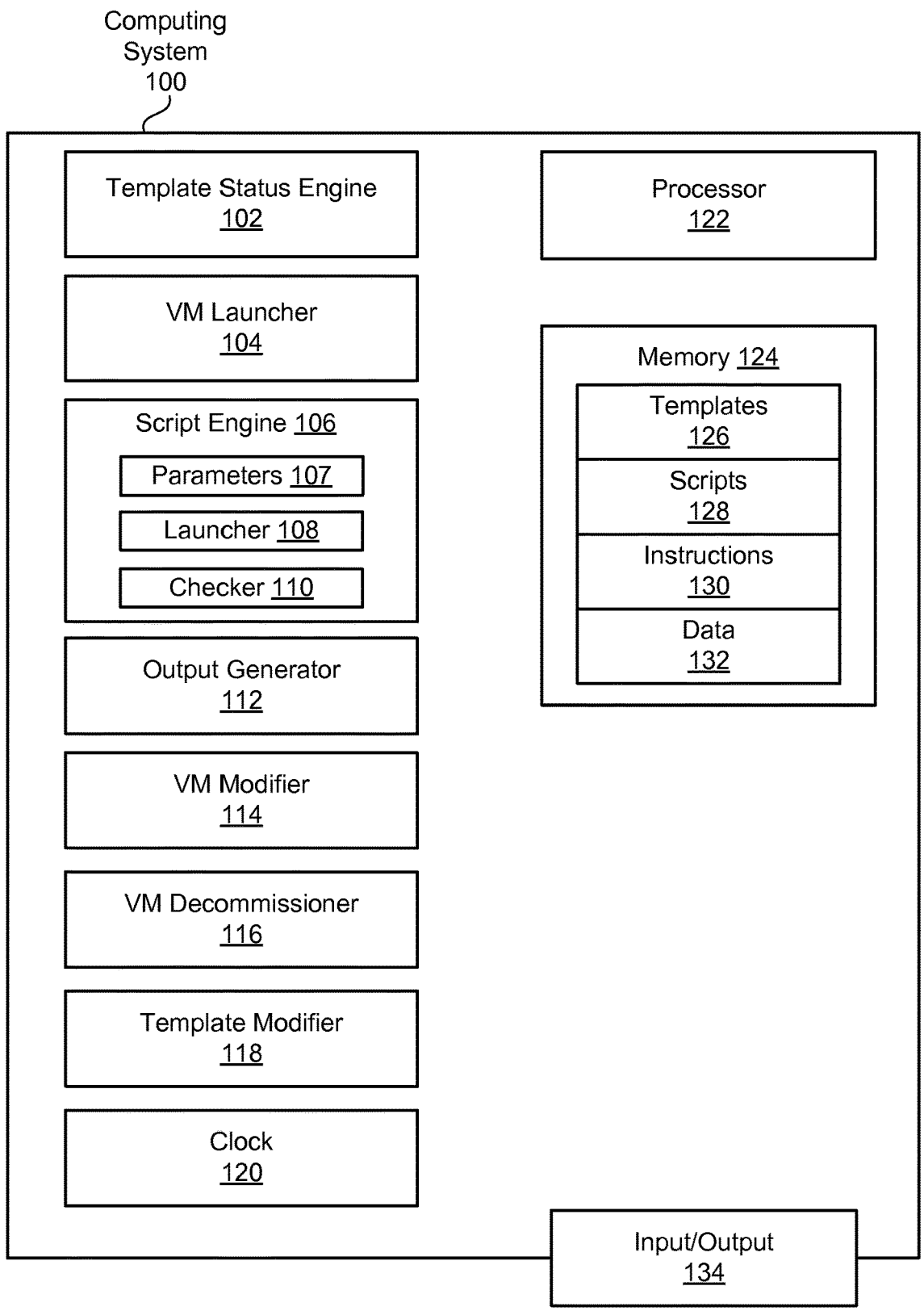
FIG. 1 is a block diagram of a computing system for maintaining virtual machine templates.

Virtual machine templates may be stored for provisioning, cloning, and/or launching as virtual machines. When provisioned, cloned, and/or launched, the virtual machines may have unknown problems, such as corruption of the system or boot files, missing operating system level files, difficulty or inability to run or interface with third-party applications or databases, security flaws, or failure to comply with regulations.

The virtual machine templates may have initially been correctly designed to address known issues. However, new issues, such as new third-party applications or databases, new security threats, or new regulatory requirements, may create problems with virtual machines that are provisioned, cloned, and/or launched from virtual machine templates that previously did not have any known problems. Dozens or even hundreds of virtual machine templates may be stored and ready for provisioning, cloning, and/or launching as virtual servers. It may difficult to maintain and/or patch a large number of stored virtual machine templates.

To proactively address new issues before they cause problems such as operations failures or security breaches, a computing system may run status level checks on virtual machines provisioned, cloned, and/or launched from the stored virtual machine templates. The virtual machines provisioned, cloned, and/or launched from the stored virtual machine templates may be provisioned, cloned, and/or launched temporarily, and may be considered temporary virtual machines. Example status level checks are shown and described with respect to FIGS. 2, 4, 5, and 6. The status level checks may run as background jobs while other applications are still running. The status level checks, which may include running testing scripts on the virtual machines, may be updated by an administrator based on new issues, such as new third-party applications or databases, new security threats, or new regulatory requirements. The virtual machine templates may be tested against the new status level checks. The status level checks may include checks for determining whether a service is running, whether a service starts or stops, whether specified ports are responding to connection requests, whether the virtual machine's database is responding to connections, whether specified applications are launching from the virtual machine, application level security parameters, and application level compliance, as non-limiting examples.

If the virtual machine templates pass the status level checks run on their corresponding virtual machines, then the virtual machines may be decommissioned and the corresponding virtual machine templates may be considered ready for provisioning. If the virtual machine templates do not pass the status level checks run on their corresponding virtual machines, then an output report may indicate which checks were not passed. A system administrator may modify the virtual machines to address the failed checks caused by the new issues. The virtual machines may then be tested again and, if necessary, modified until passing the status level checks. After the virtual machines pass the status level checks, the virtual machines may be decommissioned, and the modifications made to the virtual machines may be propagated to the corresponding virtual machine templates.

FIG. 1 is a block diagram of a computing system 100 for maintaining virtual machine templates. The computing system 100 may include a single computer such as a server, or multiple computers in a distributed system in which information is stored in, and tasks are performed by, multiple computers. The computing system 100 may include, for example, a health status server that launches virtual machines from virtual machine templates, runs scripts against the virtual machines to test whether the virtual machines pass predetermined tests and/or requirements, and generates output reports indicating whether the virtual machines have passed the tests, scripts, and/or requirements. If the output reports indicate that the virtual machines have not passed any of the tests, scripts, and/or requirements, then an administrator may modify the virtual machines until the virtual machines pass all of the tests, scripts, and/or requirements. Upon decommissioning the virtual machines, the computing system 100 may modify the corresponding virtual machine templates based on the administrator's modifications of the virtual machines, and/or the computing system 100 may propagate the administrator's modifications to the virtual machines to their corresponding virtual machine templates.

The computing system 100 may include a template status engine 102. The template status engine 102 may run and/or launch a background health status job that runs against configured templates and provides runtime statuses of the templates including generating output reports, such as the output reports shown and described with reference to FIGS. 3A and 3B. The background health status job run and/or launched by the template status engine 102 may perform any combination of the methods, functions, or procedures described herein to assist in maintaining the health of virtual machine templates. The background health status job may, for example, run at regular intervals such as hourly, daily, weekly, or monthly, while other applications are running on the computing system 100.

The computing system 100 may include a virtual machine launcher 104. The virtual machine launcher 104 may include a hypervisor such as VMware, or a server provisioning application server such as Blade Logic Server Automation. The virtual machine launcher 104 may launch, clone, and/or provision virtual machines from virtual machine templates. The virtual machine launcher 104 may access the template from a host named in the parameters 107, described below. The launched, cloned, and/or provisioned virtual machines may run on the computing system 100, any other computing system, or multiple computing systems which may or may not include the computing system 100. The virtual machine templates from which the virtual machines are launched, cloned, and/or provisioned may be stored on the computing system 100 or any other computing system.

The computing system 100 may include a script engine 106. The script engine 106 may test the virtual machines for compliance with various parameters and/or tests, such as health or corruption of system or boot files, missing operating system level files, proper functioning of third-party applications or databases installed on the virtual machine template, security attacks and/or flaws, and/or compliance with regulations such as government regulations. The parameters may change over time, requiring the scripts to be updated and used to test the virtual machines multiple times as the parameters change.

The script engine 106 may include a parameters module 107. The parameters module 107 may store the parameters and/or scripts that the script engine 106 will run against and/or use to test the virtual machines. The parameters module 107 may store different sets of parameters and/or scripts; each different set of parameters and/or scripts may be associated with a different customer, who may wish to know the result of running tests based on their particular parameters and/or scripts against the virtual machines. The parameters and/or scripts may be updated by an administrator to address new issues, such as new third-party applications, new third-party application programming interfaces (APIs), new security threats, and/or new regulations. Parameters may include a name of a host such as a VMware hypervisor where the virtual machine template is present, a name of a template against which a job will execute, a schedule of when the job will run such as manually or at regular intervals, which operating system health checks will be performed such as operating system files, operating system services, and operating system patches, which machine or system health checks will be performed such as determining whether sufficient storage is available, and/or application checks such as determining whether applications installed on the virtual machine template are functioning properly. Application checks may check third-party applications installed on the virtual machine and/or virtual machine template, such as databases, web applications, network applications, and/or standalone applications. The application checks may determine whether the applications run properly, whether the applications start and stop properly, whether ports on the applications are configured properly, whether the applications properly respond to database connection requests, whether the applications launch properly, whether the applications comply with security parameters and/or security requirements, and/or whether the applications comply with regulatory requirements. In an example implementation, nsh scripts may run against remote servers and applications.

In an example implementation, the computing system 100 may, in conjunction with the script engine 106, determine the status of templates by prompting the template status engine 102 to launch background health status jobs in response to changes to the parameters and/or scripts. The parameters module 107 may include parameters and/or scripts to determine whether the virtual machines launched, cloned, and/or provisioned from the virtual machine templates have system or boot files that have been corrupted, have missing operating system files, corruption of or missing dynamic link library (DLL) files, have difficulty interfacing with or running third-party applications or databases, operating system-level or application-level security flaws, or failure to comply with regulations.

The script engine 106 may include a script launcher 108. The script launcher 108 may launch one or multiple scripts for each virtual machine. Each of the scripts may perform and/or call functions on the virtual machines. The scripts may run directly on the virtual machines, may prompt the virtual machines to make remote calls on other machines, or may be remote calls on the virtual machines. The script launcher may launch multiple scripts as a batch job to run on each virtual machine. The batch job may run multiple scripts simultaneously and/or concurrently on a single virtual machine.

The script engine 106 may include a script checker 110. The script checker 110 may check and/or determine whether the virtual machine has passed each of the scripts and/or tests based on scripts. The script checker 110 may check and/or determine whether the virtual machine has passed the scripts and/or tests by reading output from the virtual machine, or by reading output from another computing device that the virtual machine is interfacing with. The script launcher 108 and/or script checker 110 may run and/or check all the scripts against each virtual machine, or may run and/or check scripts against each virtual machine only until the virtual machine fails one of the scripts, at which time the script launcher 108 and/or script checker 110 may stop launching and/or checking the scripts against that virtual machine.

The computing system 100 may include an output generator 112. The output generator 112 may generate output indicating whether each of the virtual machines has passed the scripts and/or tests. The output generator 112 may generate, for example, an output report for each of the virtual machines indicating whether the virtual machine has passed the scripts and/or tests. The output reports may indicate whether the virtual machine has passed or failed every script and/or test, or may indicate whether the virtual machine has passed or failed each script and/or test until reaching a script and/or test that the virtual machine failed, at which point no further indications for scripts and/or tests will be included.

The output reports may be provided to an administrator of the computing system 100 and/or of the virtual machine templates. The output reports may be provided to the administrator electronically, such as displayed on a screen, by storing a file on a machine accessible by the administrator such as the computing system 100, or by sending an email to the administrator, or may be provided to the administrator by printing the output report. Example output reports are shown and described with respect to FIGS. 3A and 3B.

The computing system 100 may include a virtual machine modifier 114. The virtual machine modifier 114 may receive input from an administrator, and modify the virtual machine based on the input received from the administrator. The administrator may provide the input to the virtual machine modifier 114 based on the output reports indicating that the virtual machine has failed specified tests or scripts. The input may include changes to and/or additions to code for the virtual machine, and/or changes to parameters, such as computing resources, including processing capacity, memory, and/or communication resources, available to the virtual machine. The virtual machine modifier 114 may modify the virtual machine based on the input received from the administrator. The virtual machine may continue running after the modifications performed by the virtual machine modifier 114. The continuing to run after the modifications to the virtual machine by the virtual machine modifier 114 may allow the script engine 106 to run the scripts and/or tests against the virtual machine again to determine whether the modifications caused the virtual machine to pass the scripts and/or tests. In an example, if the virtual machine fails a test and/or script, the administrator may decide to fix the template at a later time. In this example, the administrator may instruct the computing system 100 to delete and/or decommission the virtual machine.

The computing system 100 may include a virtual machine decommissioner 116. The virtual machine decommissioner 116 may decommission the virtual machine and/or cause the virtual machine to stop running after the virtual machine has passed all the tests and/or scripts, as indicated by the script engine 106 and/or output generator 112. The virtual machine decommissioner 116 may prompt a template modifier 118 to propagate, to the virtual machine template, the changes and/or modifications performed by the virtual machine modifier 114 on the virtual machine.

The computing system 100 may include a template modifier 118. The template modifier 118 may propagate changes and/or modifications to the stored virtual machine template based on modifications to the corresponding virtual machine performed by the virtual machine modifier 114. The template modifier 118 may make and/or propagate the changes to the stored virtual machine template during the runtime of the virtual machine, or may make and/or propagate the changes to the virtual machine after the virtual machine has been decommissioned and/or stopped running.

The computing system 100 may include a clock 120. The clock 120 may maintain a date and/or time. In an example implementation, the computing system 100 may, in conjunction with the clock 120, determine the status of templates by prompting the template status engine 102 to launch background health status jobs at periodic intervals, such as once an hour, once a day, once a week, or once a month.

The computing system 100 may include at least one processor 122. The at least one processor 122 may include a single processor or multiple processors, with each processor having one or multiple cores. The at least one processor 122 may be included on a single computing device or distributed among multiple computing devices. The at least one processor 122 may be capable of executing instructions, such as instructions stored in a memory 124, to perform any combination of the functions, procedures, and/or methods described herein.

The computing system 100 may include a memory 124. The memory 124 may include one or multiple memory devices, and may be included on a single computing device or distributed among multiple computing devices.

The memory 124 may store the virtual machine templates 126. The memory 124 may store the virtual machine templates 126 for launching, cloning, and/or provisioning by the virtual machine launcher 104, and may update the stored virtual machine templates 126 to reflect changes and/or modifications to the virtual machine templates performed by the template modifier 118.

The memory 124 may store the scripts 128 launched by the script engine 106. The scripts 128 may be updated, modified, added, or removed by an administrator based on changing needs for the virtual machines cloned, provisioned, or launched from the virtual machine templates 126.

The memory 124 may also store instructions 130 for execution by the at least one processor 122. The instructions 130 may include instructions to perform any combination of the functions, procedures, and/or methods described herein. The memory 124 may also store data 132, such as data used by the output generator 112 to generate output reports.

The computing system 100 may include one or more input/output modules 134. The input/output module(s) 134 may be a single or multiple interfaces capable of providing and/or receiving output and input, and may provide and/or receive output and input to and from other computing devices and/or human users.

Figure 2:
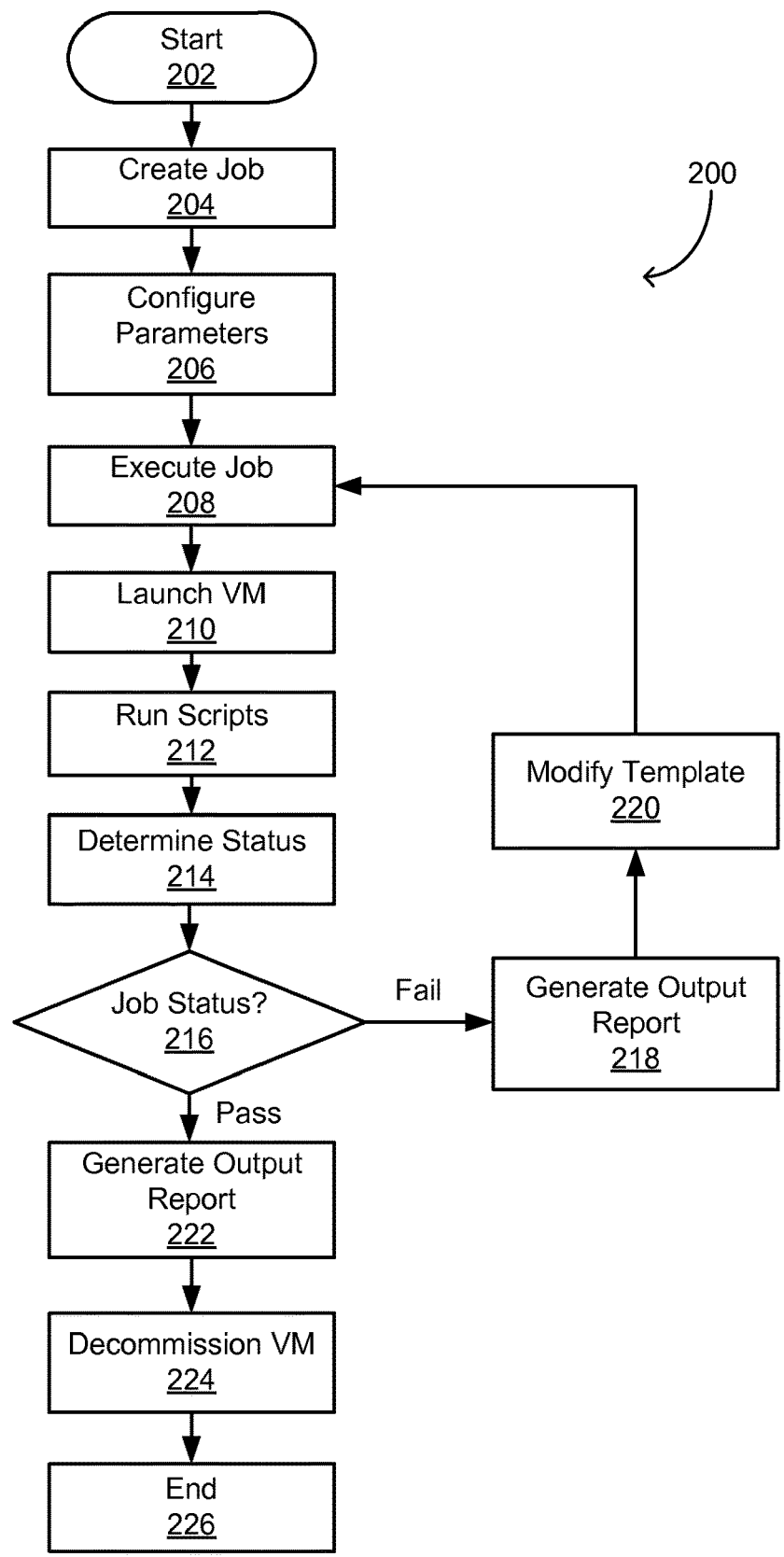
FIG. 2 is a flowchart showing a method for determining a health of a virtual machine template and modifying the virtual machine template to address any problems with the virtual machine template.

FIG. 2 is a flowchart showing a method 200 for maintaining a virtual machine template by determining a health of the virtual machine template and modifying the virtual machine template to address any problems with the virtual machine template. The method 200 may start (202). The method 200 may start (202) at regular intervals, such as hourly, daily, weekly, or monthly, in response to a request or instruction from an administrator, or in response to the parameters 107 and/or scripts 128 being updated, according to example implementations.

The method 200 may include the template status engine 102 creating a job (204). The template status engine 102 may create the job (204) by, for example, creating a template health status job that will determine the health of one, or multiple, virtual machine templates. The template health status job may clone, provision, and/or launch one or multiple virtual machines from virtual machine templates, run tests or scripts against the virtual machine(s), and generate status report(s) for each virtual machine.

The method 200 may include the script engine 106 configuring parameters 107 (206). The script engine 106 may configure parameters 107 for performing the checks on the virtual machine(s) based on performing instructions stored in code, and/or based on instructions received from the administrator. The parameters 107 may include system health parameter(s), operating system health parameter(s), and/or application health parameter(s). The parameters 107 may be configured by the scripts 128 stored in memory 124, and/or may be set based on input from the administrator.

The method 200 may include the template status engine 102 executing the job (208). The template status engine 102 may, for example, execute the template health status job. Executing the job (208) may include cloning, provisioning, and/or launching the virtual machine(s) from the virtual machine template(s), running the scripts and/or tests on the virtual machine(s), determining the status of each virtual machine, and providing an indication of the status of each virtual machine, until the virtual machine(s) pass the scripts and/or tests.

The method 200 may include the virtual machine launcher 104 launching the virtual machine(s) (210). Launching the virtual machine (210) may include launching, cloning, and/or provisioning the virtual machine(s) from the virtual machine template(s).

The method 200 may include the script engine 106 and/or script launcher 108 running scripts on and/or against the virtual machine(s) (212). The script checker 110 may check the status of the virtual machine(s) with respect to the scripts run on and/or against the virtual machine(s). The script engine 106 may, for example, run system-level checks on and/or against the virtual machine(s), run operating system-level checks on and/or against the virtual machine(s), and/or run application-level checks on and/or against the virtual machine(s).

Based on the running the scripts (212), the method 200 may include the script checker 110 determining the status (214) of the virtual machine(s) with respect to the scripts (212). Determining the status (214) may include determining whether the virtual machine(s) passed or failed each of the scripts, or determining whether the virtual machine(s) passed all of the scripts or failed at least one script.

Figure 3A:
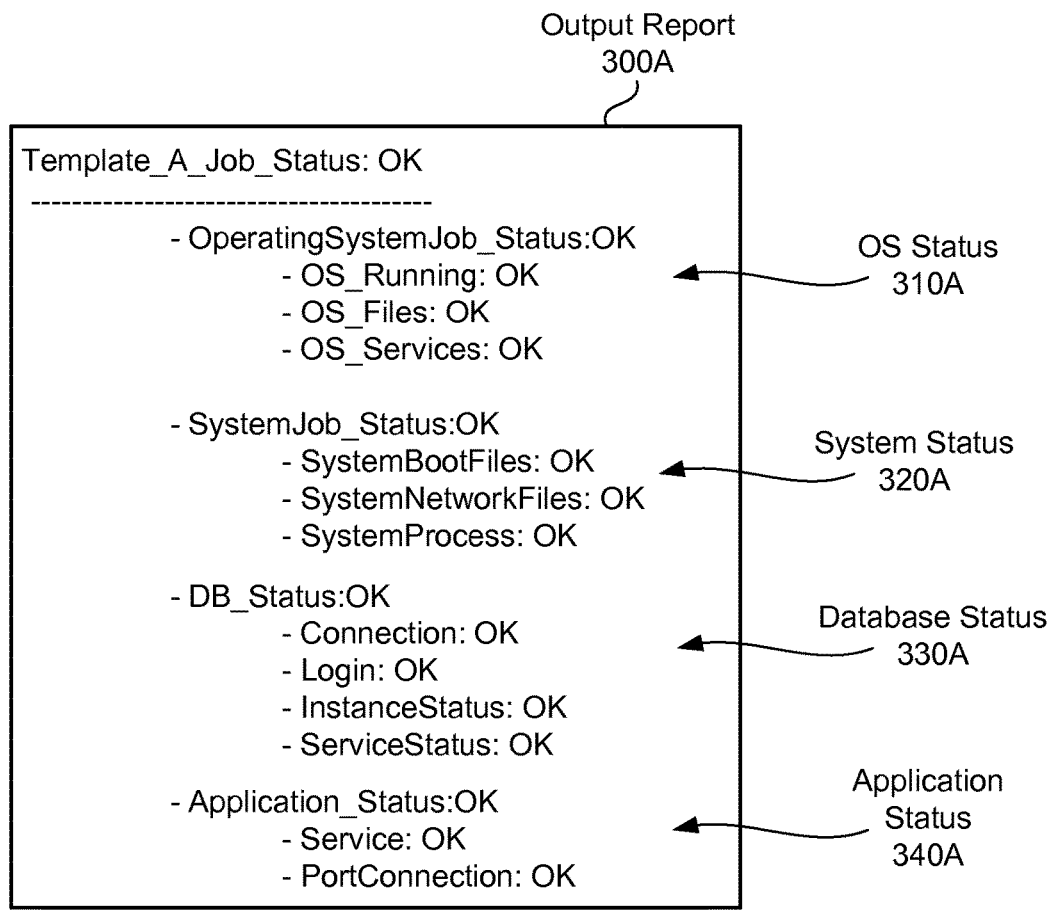
FIG. 3A shows an output report in which a virtual machine template passed all tests.

The method 200 may include the script checker 110 determining a job status, such as a template health status, of each virtual machine (216). If a given virtual machine passed all of the tests associated with the scripts, then the virtual machine may be considered to have passed the job, and the output generator 112 may generate an output report (222) indicating that the virtual machine passed the job. An example output report 300A indicating that a virtual machine passed all of the tests is shown in FIG. 3A.

Figure 3B:
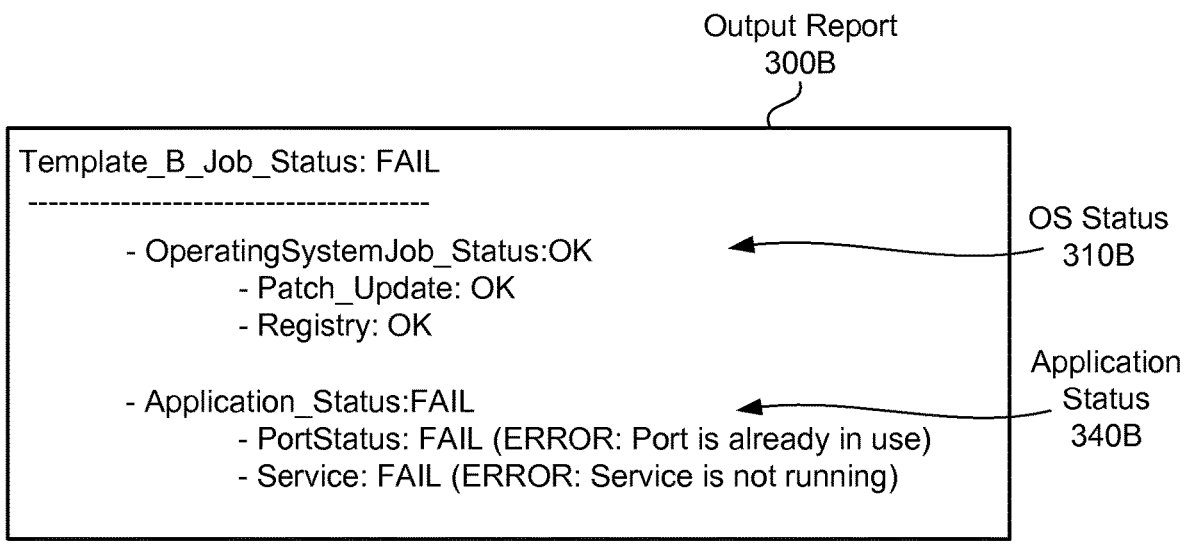
FIG. 3B shows an output report in which a virtual machine template did not pass all the tests.

If a given virtual machine did not pass all of the tests associated with the scripts, and/or failed at least one test associated with a script, then the virtual machine may be considered to have failed the job. If the virtual machine failed the job, then the output generator 112 may generate an output report (218) indicating that the virtual machine failed at least one test associated with a script. An example output report 300B indicating that the virtual machine failed at least one test associated with a script, and/or did not pass all of the tests associated with the scripts, is shown in FIG. 3B.

If the virtual machine failed the job, the virtual machine modifier 114 may modify the virtual machine (220). The virtual machine modifier 114 may modify the virtual machine (220) based on input received from an administrator. The input received from the administrator may include modifications to computer program code and/or instructions used to run the virtual machine, or changes to parameters such as computing resources, including allowed processor use, allowed memory use, and/or allowed communication resources. The administrator may provide the input to the virtual machine modifier 114 to modify the virtual machine based on the output report 300B in an attempt to fix and/or resolve the issues or problems indicated by the output report 300B. After the virtual machine modifier 114 has modified the virtual machine (220), the computing system 100 may execute the job against the virtual machine again. The modifications to the virtual machine may be made by the virtual machine modifier 114 with the virtual machine still running, and the tests may be performed on the virtual machine still running, propagating the changes from the virtual machine to the corresponding virtual machine template, and later decommissioning the virtual machine. In another example, the virtual machine may be decommissioned, changes to the virtual machine propagated to the virtual machine template, and the virtual machine re-launched, re-cloned, and/or re-provisioned from the virtual machine template (210).

After the virtual machine has passed the job and the output report 300A has been generated (222) indicating that the virtual machine passed all the tests, the virtual machine decommissioner 116 may decommission the virtual machine (224). The virtual machine decommissioner 116 may decommission the virtual machine (224) by instructing the virtual machine to turn off and/or stop running, and/or by removing and/or freeing computing resources from the virtual machine. After the virtual machine has been decommissioned (224), the template modifier 118 may propagate any changes that were made to the virtual machine to the corresponding virtual machine template. After the virtual machine has been decommissioned (224) and any changes to the virtual machine have been propagated to the corresponding virtual machine template, the method 200 may end (226). Upon decommissioning the virtual machine (224), the computing system 100 may also delete and/or remove the data used to generate the output report(s).

FIG. 3A shows an output report 300A indicating that a virtual machine template passed all the tests. As shown in FIG. 3A, the output report 300A may include an operating system job status report 310A indicating that the operating system is running correctly, including passing tests on the running operating system, operating system files, and operating system services. As shown in FIG. 3A, the output report 300A may include a system job status report 320A indicating that systems are running correctly, including passing tests on system boot files, system network files, and system processes. As shown in FIG. 3A, the output report 300A may include a database job status report 330A indicating that the database is running correctly, including passing a connection test, a login test, a database instance test, and a database service test. As shown in FIG. 3A, the output report 300A may include an application status report 340A indicating that the virtual machine is correctly interfacing with a third-party application, including interfacing with the third-party application service and establishing a port connection with the third-party application. This output report 300A is merely an example. Results of additional and/or different tests may be included in other output reports.

FIG. 3B shows an output report 300B indicating that a virtual machine template did not pass all the tests. As shown in FIG. 3B, the output report 300A may include an operating system report 310B indicating that the operating system is running correctly, including passing a patch update test and a registry test. As shown in FIG. 3B, the output report 300B may include an application status report 340B indicating that the virtual machine is not interfacing correctly with a third party application, including failing to connect via a port because the port is already in use, and failing to interface with the third-party application service because the service is not running. In an example implementation, the computing system 100 may have stopped performing the tests and/or running the scripts when the virtual machine failed the third-party application tests, obviating the need for the systems checks and the database checks. In another example implementation, the computing system 100 may continue to perform all of the tests and running all of the scripts even though the virtual machine has failed one or more of the tests, and the output report 300B may indicate success or failure of the virtual machine with respect to all of the tests and/or scripts. This output report 300B is merely an example. Results of additional and/or different tests may be included in other output reports.

Figure 4:
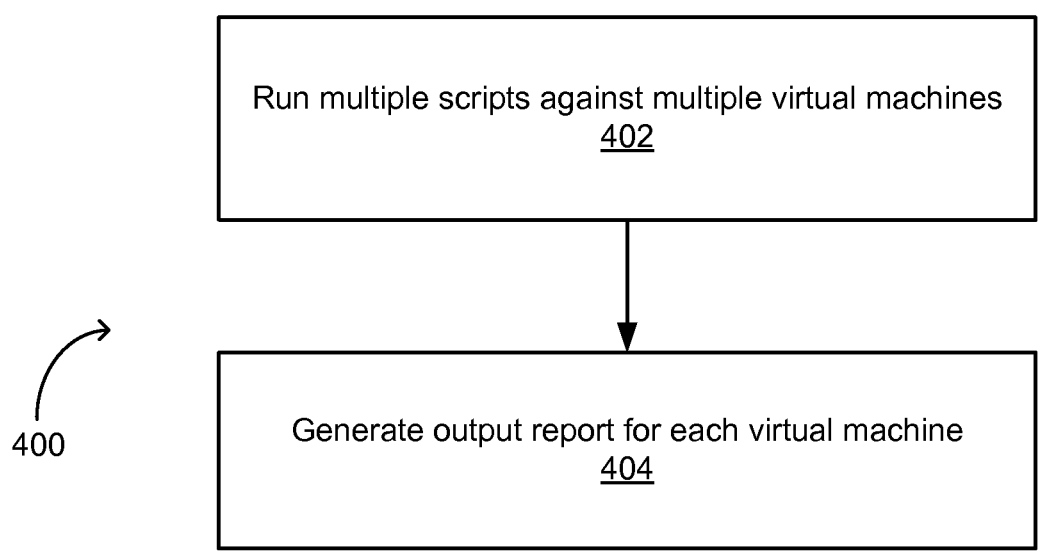
FIG. 4 is a flowchart showing a method according to an example implementation.

FIG. 4 is a flowchart showing a method 400 according to an example implementation. According to this example, the method may include running multiple scripts against multiple virtual machines, each of the multiple virtual machines being generated from one of the multiple virtual machine templates (402). The method 400 may also include generating, for each of the multiple virtual machines, an output report indicating success or failure for each of the multiple scripts (404).

According to an example implementation, the multiple scripts may be run concurrently against each of the multiple machines.

According to an example implementation, the multiple scripts may be run as background processes while other applications are running.

According to an example implementation, the running multiple scripts may comprise running different sets of scripts for different customers.

According to an example implementation, the method 400 further comprise receiving modifications to the virtual machines and propagating the modifications from the virtual machines to the virtual machine templates.

Figure 5:
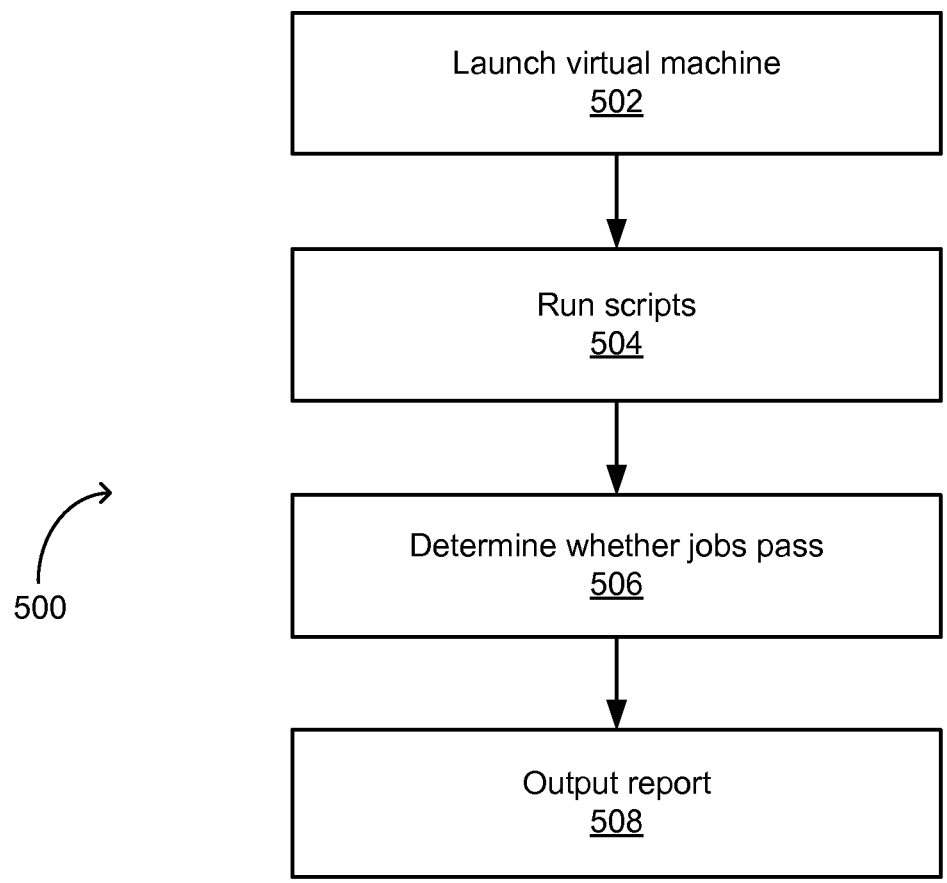
FIG. 5 is a flowchart showing a method according to an example implementation.

FIG. 5 is a flowchart showing a method 500 according to an example implementation. According to an example implementation, the method 500 may include launching a virtual machine from a virtual machine template (502). The method 500 may also include running at least a first script and a second script against the virtual machine (504). The method 500 may also include determining whether a first job passes the first script and whether a second job passes the second script (506). The method 500 may also include outputting a report indicating whether the first job passed and whether the second job passed (508).

According to an example implementation, the first script and the second script may be run concurrently against the virtual machine.

According to an example implementation, the first script may prompt the virtual machine to execute a boot file and the second script may prompt the virtual machine to execute an operating system file.

According to an example implementation, the first script may prompt the virtual machine to read data from a third-party database and the second script may prompt the virtual machine to write data to the third-party database.

According to an example implementation, the first script may prompt the virtual machine to launch a third-party application and the second script may prompt the virtual machine to call a third-party application programming interface (API).

According to an example implementation, the first script may compare execution of a file included in the virtual machine to a governmental regulation requirement and the second script may implement a security threat against the virtual machine.

According to an example implementation, the first script may request connection to the virtual machine via a specified port and the second script may request the virtual machine to start and stop a service.

According to an example implementation, the running at least the first script and the second script may include running at least the first script and the second script concurrently against the virtual machine.

According to an example implementation, the method 500 may include performing the launching, running, determining, and outputting on multiple virtual machine templates at regular intervals.

According to an example implementation, the method 500 may include performing the launching, running, determining, and outputting are performed as background jobs on multiple virtual machine templates.

According to an example implementation, the method 500 may include performing the launching, running, determining, and outputting on multiple virtual machine templates in response to an administrator adding a new script.

According to an example implementation, the method 500 may further include receiving modification input based on the report indicating that the first job did not pass, and modifying the virtual machine based on the received modification input.

According to an example implementation, the method 500 may further include implementing modifications to the virtual machine template based on the modifications to the virtual machine, and decommissioning the virtual machine.

According to an example implementation, the decommissioning the virtual machine may be performed in response to determining that the first job passes the first script after the virtual machine was modified based on the received modification input.

Figure 6:
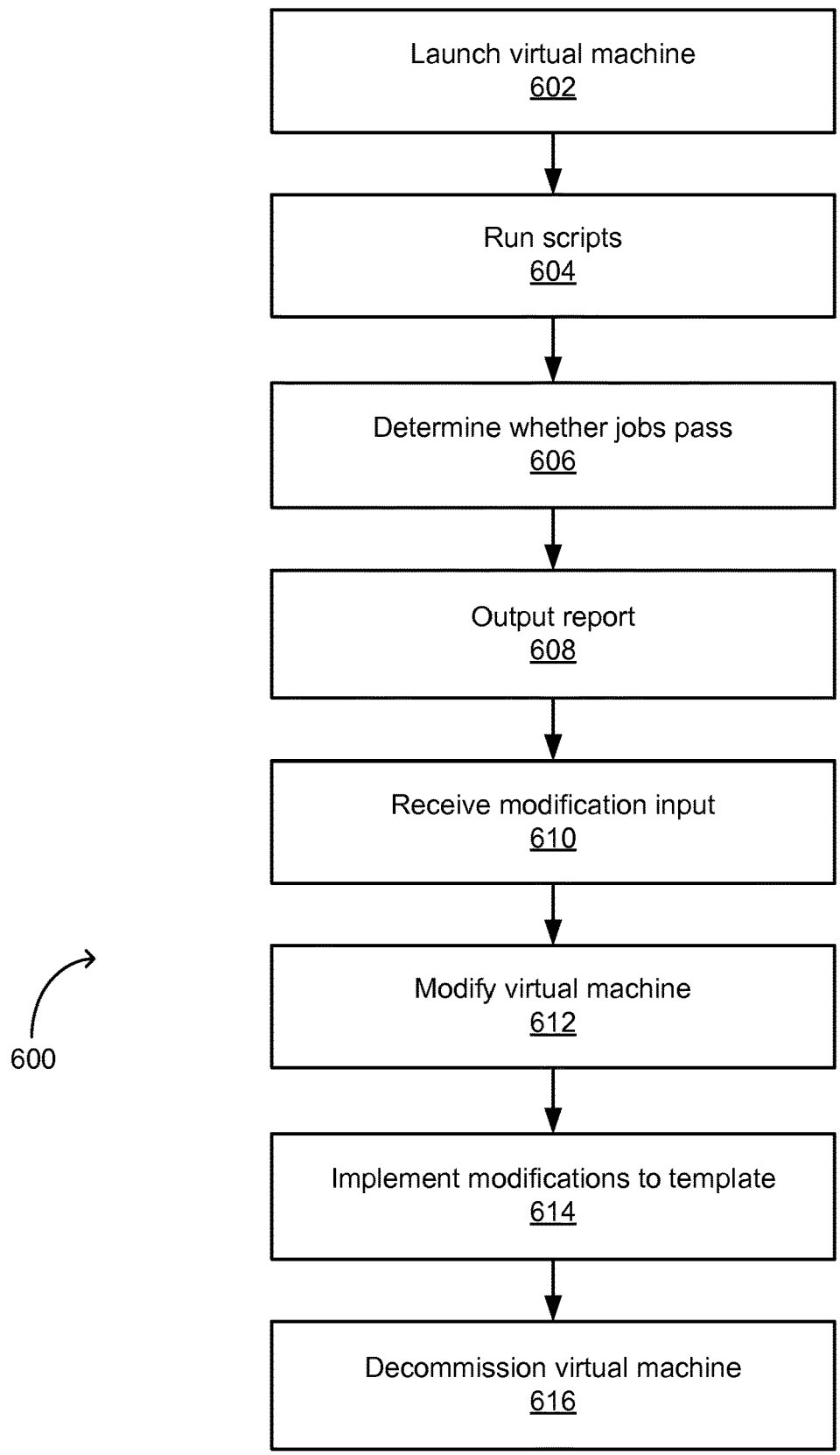
FIG. 6 is a flowchart showing a method according to an example implementation.

FIG. 6 is a flowchart showing a method 600 according to an example implementation. In this example, the method 600 may include launching a virtual machine from a virtual machine template (602). The method 600 may also include concurrently running at least a first script and a second script against the virtual machine as background jobs (604). The method 600 may also include determining whether a first job passes the first script and a second job passes the second script (606). The method 600 may also include outputting a report indicating whether the first job passed and whether the second job passed (608). The method 600 may also include receiving modification input based on the report indicating that the first job did not pass (610). The method 600 may also include modifying the virtual machine based on the received modification input (612). The method 600 may also include implementing modifications to the virtual machine template based on the modifications to the virtual machine (614). The method 600 may also include decommissioning the virtual machine in response to determining that the first job passed and the second job passed (616).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions for determining health statuses of multiple virtual machine templates stored thereon that, when executed by at least one processor, are configured to cause a health status server to at least:
   in response to a change to a script to address at least one of a security threat or a regulatory requirement created by a third party, launch multiple virtual machines from the multiple virtual machine templates;
   run the changed script against the multiple virtual machines;
   generate, for each of the multiple virtual machines, an output report indicating success or failure for the virtual machine against the changed script;
   modify, based on the output report indicating failure for at least one of the virtual machines, at least one of the multiple virtual machine templates, the modification being performed during runtime of the at least one virtual machine; and
   decommission, based on a subsequent output report indicating success for at least one of the virtual machines after the modification performed during runtime, the at least one modified launched virtual machine for which the template was modified.

2. The non-transitory computer-readable storage medium of claim 1, wherein the changed script runs concurrently against each of the multiple virtual machines.

3. The non-transitory computer-readable storage medium of claim 1, wherein the changed script runs as background processes against the multiple virtual machines while other applications are running on the multiple virtual machines.

4. The non-transitory computer-readable storage medium of claim 1, wherein the instructions are further configured to cause the health server to run different sets of scripts for different customers.

5. The non-transitory computer-readable storage medium of claim 1, further comprising, based on at least one of the virtual machines failing a test based on the changed script, receiving modifications to the virtual machines and propagating the modifications from the virtual machines to the virtual machine templates.

6. The non-transitory computer-readable storage medium of claim 1, wherein the changed script further determines whether the multiple virtual machines have corrupted or missing dynamic link library (DLL) files.

7. The non-transitory computer-readable storage medium of claim 1, wherein the changed script further determines whether the multiple virtual machines have corrupted system files.

8. The non-transitory computer-readable storage medium of claim 1, wherein the change to the script addresses a third-party application.

9. The non-transitory computer-readable storage medium of claim 1, wherein the change to the script addresses a third-party application programming interface (API).

10. The non-transitory computer-readable storage medium of claim 1, wherein the at least one of the security threat or the regulatory requirement comprises the security threat.

11. The non-transitory computer-readable storage medium of claim 1, wherein the at least one of the security threat or the regulatory requirement comprises the regulatory requirement.

12. A non-transitory computer-readable storage medium comprising instructions for determining health statuses of multiple virtual machine templates stored thereon that, when executed by at least one processor, are configured to cause a health status server to at least:
in response to a change to at least a first script addressing a first issue created by a first third party and a second script addressing a second issue created by a second third party, launch a virtual machine from a virtual machine template;
run at least the first script and the second script against the launched virtual machine;
determine whether a first job running on the launched virtual machine passes the first script and whether a second job running on the launched virtual machine passes the second script;
output a report indicating that the first job failed to pass the first script and the second job passed the second script;
modify the launched virtual machine to address the failure to pass the first script based on the report indicating that the first job failed to pass the first script, the modification including adding code to the virtual machine template from which the virtual machine was launched;
determine, after the modification to the launched virtual machine, that the modified launched virtual machine passed both the first script and the second script; and
based on the determination that the modified launched virtual machine passed both the first script and the second script, decommission the modified launched virtual machine.

13. The non-transitory computer-readable storage medium of claim 12, wherein the first script prompts the launched virtual machine to execute a boot file and the second script prompts the launched virtual machine to execute an operating system file.

14. The non-transitory computer-readable storage medium of claim 12, wherein the first script prompts the launched virtual machine to read data from a third-party database and the second script prompts the launched virtual machine to write data to the third-party database.

15. The non-transitory computer-readable storage medium of claim 12, wherein the first script prompts the launched virtual machine to launch a third-party application and the second script prompts the launched virtual machine to call a third-party application programming interface (API).

16. The non-transitory computer-readable storage medium of claim 12, wherein the first script compares execution of a file included in the launched virtual machine to a governmental regulation requirement and the second script implements a security threat against the launched virtual machine.

17. The non-transitory computer-readable storage medium of claim 12, wherein the launching, running, determining whether the first job passes the first script and the second job passes the second script, and outputting are performed on multiple virtual machine templates in response to an administrator adding a new script.

18. The non-transitory computer-readable storage medium of claim 12, wherein the instructions are further configured to cause the health status server to implement modifications to the launched virtual machine template based on the modifications to the launched virtual machine.

19. The non-transitory computer-readable storage medium of claim 12, wherein, after decommissioning the virtual machine, the instructions are further configured to propagate in the virtual machine template the modification to the launched virtual machine to address the failure to pass the first script.

20. A non-transitory computer-readable storage medium comprising instructions for determining health statuses of multiple virtual machine templates stored thereon that, when executed by at least one processor, are configured to cause a health status server to at least:
in response to a change to at least a first script addressing a first issue created by a first third party and a second script addressing a second issue created by a second third party, launch a virtual machine from a virtual machine template, the first script being associated with a first customer and the second script being associated with a second customer;
concurrently run at least the first script and the second script against the virtual machine as background jobs;
determine that a first job does not pass the first script and that a second job passes the second script;
output a report indicating that the first job did not pass and that the second job passed;
receive modification input to resolve a problem indicated by the report based on the report indicating that the first job did not pass;
modify the virtual machine to resolve the problem indicated by the report based on the received modification input;
implement modifications to the virtual machine template to resolve the problem indicated by the report based on the modifications to the virtual machine;
run at least the first script against the modified virtual machine; and
decommission the modified virtual machine in response to determining that the first job passed the first script.

* * * * *